United States Patent
Choi

(10) Patent No.: US 8,359,470 B1
(45) Date of Patent: Jan. 22, 2013

(54) INCREASED SECURITY DURING NETWORK ENTRY OF WIRELESS COMMUNICATION DEVICES

(75) Inventor: Heesook Choi, Foster City, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 707 days.

(21) Appl. No.: 12/505,885

(22) Filed: Jul. 20, 2009

(51) Int. Cl.
*H04L 29/06* (2006.01)

(52) U.S. Cl. ........................................ 713/170; 380/270

(58) Field of Classification Search ................... 713/170, 713/171; 380/247, 270
See application file for complete search history.

(56) References Cited

U.S. PATENT DOCUMENTS

| | | | |
|---|---|---|---|
| 5,793,866 | A | 8/1998 | Brown et al. |
| 6,047,066 | A | 4/2000 | Brown et al. |
| 8,140,054 | B2 * | 3/2012 | Park et al. .................. 455/411 |
| 2003/0217137 | A1 | 11/2003 | Roese et al. |
| 2005/0100165 | A1 | 5/2005 | Rose et al. |
| 2006/0143458 | A1 * | 6/2006 | Tie et al. .................. 713/176 |
| 2006/0197702 | A1 | 9/2006 | Jones |
| 2008/0096529 | A1 | 4/2008 | Zellner |
| 2008/0184331 | A1 * | 7/2008 | Cam-Winget et al. ........... 726/1 |
| 2008/0198809 | A1 * | 8/2008 | Kim ........................... 370/331 |

* cited by examiner

*Primary Examiner* — Ali Abyaneh

(57) ABSTRACT

What is disclosed is a method of operating a wireless communication system. The method includes exchanging wireless communications between a wireless access node and a wireless communication device to perform a network entry process, where the network entry process comprises at least a capability exchange phase and a subsequent authentication exchange phase. The method also includes, during the capability exchange phase, transferring a capability negotiation message from the wireless communication device, and receiving the capability negotiation message in the wireless access node. The method also includes, during the authentication exchange phase, transferring an authentication key associated with the wireless communication device and a digital signature for the capability negotiation message from the wireless communication device, and receiving the authentication key associated with the wireless communication device and the digital signature for the capability negotiation message in the wireless access node. The method also includes authenticating the capability negotiation message by processing the digital signature for the capability negotiation message and the authentication key associated with the wireless communication device.

18 Claims, 6 Drawing Sheets

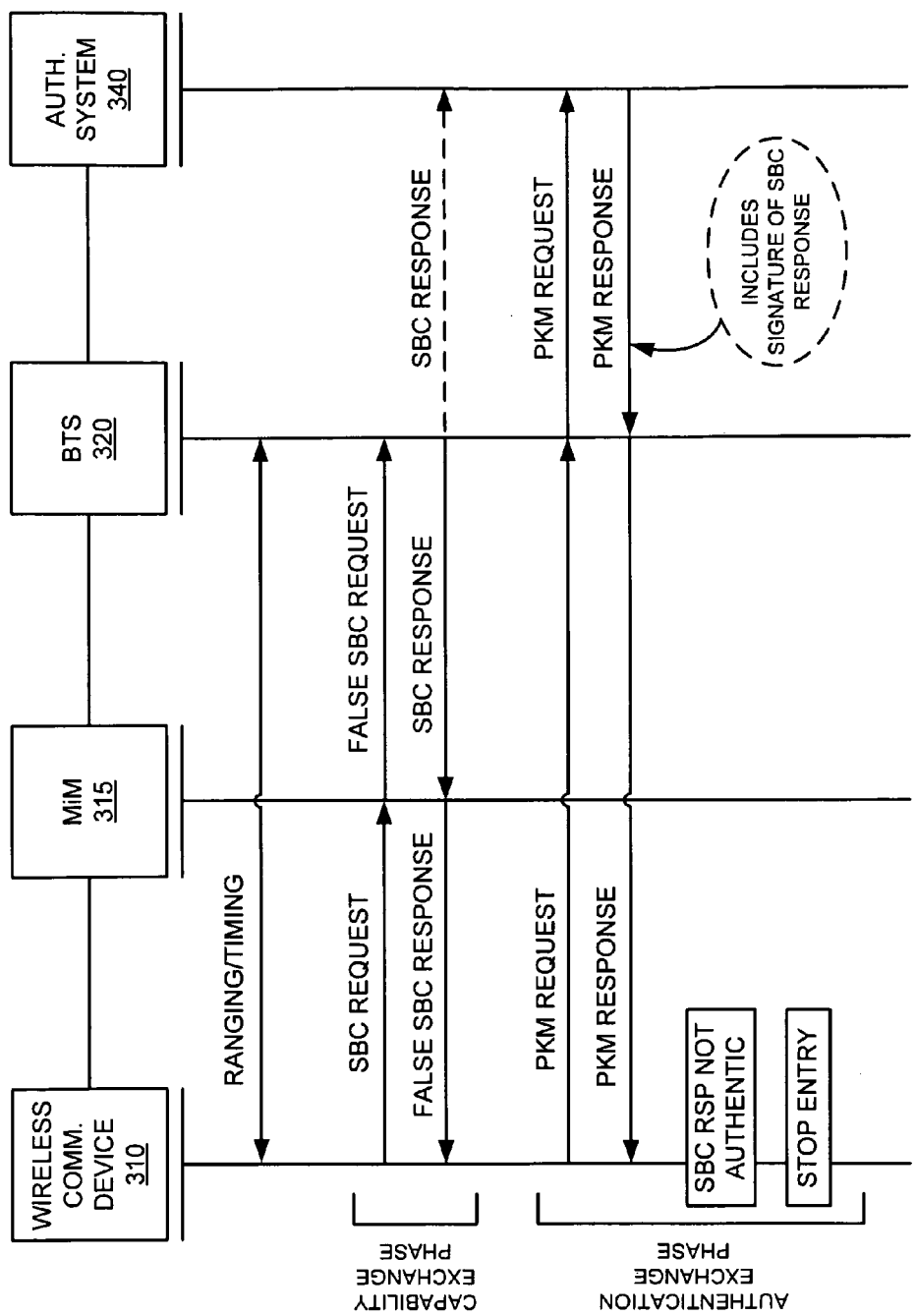

US 8,359,470 B1

INCREASED SECURITY DURING NETWORK ENTRY OF WIRELESS COMMUNICATION DEVICES

TECHNICAL FIELD

Aspects of the disclosure are related to the field of communications, and in particular, network entry and authentication techniques for wireless communication devices in wireless communication networks.

TECHNICAL BACKGROUND

Wireless communication systems typically include wireless access nodes, such as base stations, which coordinate wireless communications between wireless communication devices and a wireless communication network. In many examples of wireless communication systems, a network entry process must be completed before user communications can be exchanged between the wireless communication device and the wireless communication network.

The network entry process could include different phases during which a wireless communication device and a wireless access node exchange information related to initiating communications with the wireless communication network. This information related to initiating communications is typically transferred over a wireless link between the wireless communication device and the wireless access node.

Unfortunately, the wireless link can be susceptible to security attacks by which unauthorized users and devices can gain access to the wireless communication network by exploiting the information exchanged during the network entry process. Some examples of the security attacks include man-in-the-middle attacks, where a device is used to intercept wireless communications over a wireless link and impersonate the identity of a wireless communication device or a wireless access node.

Overview

What is disclosed is a method of operating a wireless communication system. The method includes exchanging wireless communications between a wireless access node and a wireless communication device to perform a network entry process, where the network entry process comprises at least a capability exchange phase and a subsequent authentication exchange phase. The method also includes, during the capability exchange phase, transferring a capability negotiation message from the wireless communication device, and receiving the capability negotiation message in the wireless access node. The method also includes, during the authentication exchange phase, transferring an authentication key associated with the wireless communication device and a digital signature for the capability negotiation message from the wireless communication device, and receiving the authentication key associated with the wireless communication device and the digital signature for the capability negotiation message in the wireless access node. The method also includes authenticating the capability negotiation message by processing the digital signature for the capability negotiation message and the authentication key associated with the wireless communication device.

What is also disclosed is a wireless communication system. The wireless communication system includes a wireless access node and a wireless communication device configured to perform a network entry process by exchanging wireless communications, where the network entry process comprises at least a capability exchange phase and a subsequent authentication exchange phase. During the capability exchange phase, the wireless communication device is configured to transfer a capability negotiation message, and the wireless access node is configured to receive the capability negotiation message. During the authentication exchange phase, the wireless communication device is configured to transfer an authentication key associated with the wireless communication device and a digital signature for the capability negotiation message, and the wireless access node is configured to receive the authentication key associated with the wireless communication device and the digital signature for the capability negotiation message. The wireless access node is configured to authenticate the capability negotiation message by processing the digital signature for the capability negotiation message and the authentication key associated with the wireless communication device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 6 is a sequence diagram illustrating a network entry process of a communication system.

DETAILED DESCRIPTION

Figure 1:
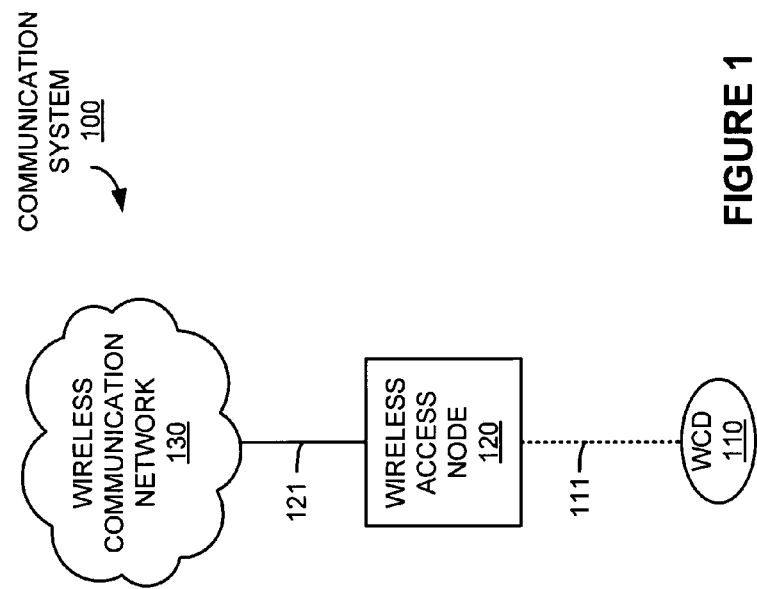
FIG. 1 is a system diagram illustrating a communication system.

FIG. 1 is a system diagram illustrating communication system 100. Communication system 100 includes wireless communication device (WCD) 110, wireless access node 120, and wireless communication network 130. Wireless communication device 110 and wireless access node 120 communicate over wireless link 111. Wireless access node 120 and wireless communication network 130 communicate over link 121.

Figure 2:
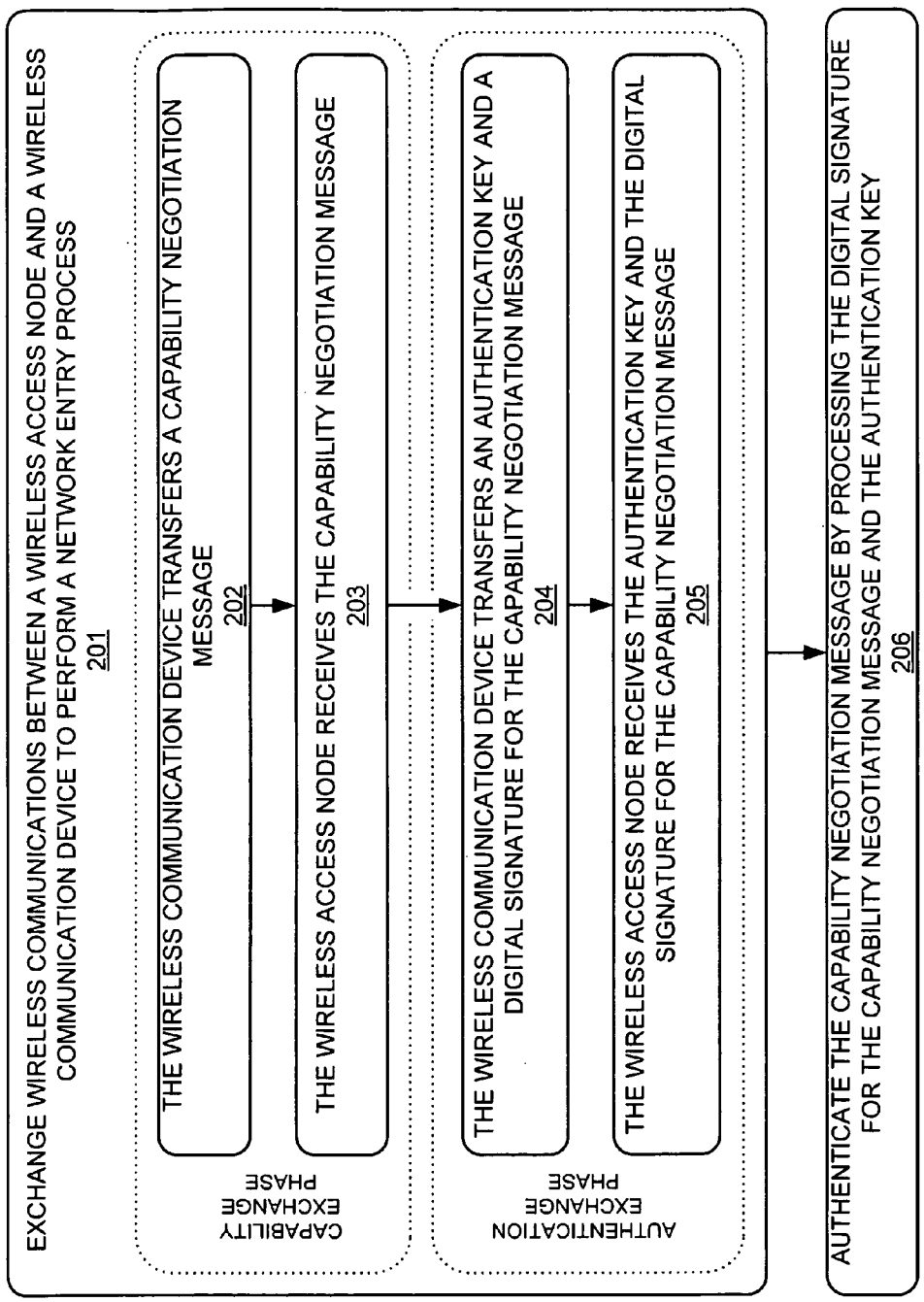
FIG. 2 is a flow diagram illustrating a method of operation of a communication system.

FIG. 2 is a flow diagram illustrating a method of operation of communication system 100, as shown in FIG. 1. The operations in FIG. 2 are listed herein parenthetically. In FIG. 2, wireless communications are exchanged (201) between wireless access node 120 and wireless communication device 110 to perform a network entry process.

The network entry process includes different phases during which wireless communication device 110 and wireless access node 120 exchange information related to initiating wireless communications. In this example, the network entry process includes two phases: a capability exchange phase and a subsequent authentication exchange phase. Other examples could include different phases related to network entry.

In the capability exchange phase, wireless communication device 110 transfers (202) a capability negotiation message. In this example, the capability negotiation message is transferred over wireless link 111. Wireless access node 120 then receives (202) the capability negotiation message over wireless link 111. This capability negotiation message includes information related to establishing communication parameters supported by wireless communication device 110 for exchanging user communications over wireless link 111. Some examples of this information in the capability negotiation message include modulation type support, power control options, bandwidth allocation parameters, security preferences, or other physical link information. In typical examples, wireless access node 120 also transfers a response to the capability negotiation message which indicates which parameters are then to be used in user communications over wireless link 111.

In the authentication exchange phase, wireless communication device 110 transfers (204) an authentication key and a digital signature for the capability negotiation message. In this example, the authentication key and the digital signature for the capability negotiation message are transferred over wireless link 111. Wireless access node 120 then receives (205) the authentication key and the digital signature for the capability negotiation message over wireless link 111. In many examples of the authentication exchange phase, other information is exchanged related to establishing secure communications over wireless link 111.

The authentication key allows another to validate whether data received from wireless communication device 110 is authentic. The authentication key could be used to authenticate data transferred from wireless communication device 110 which has been digitally signed by wireless communication device 110. In some examples, wireless communication device 110 determines the authentication key, while in other examples, the authentication key could be determined by a certificate authority or assigned by some other entity. In examples of where the authentication key is an encryption key, the authentication key could be a public encryption key used in an asymmetric public key cryptography scheme. In other examples, a symmetric secret-key cryptography scheme could be used where the same authentication key is used to encrypt and decrypt the data. It should be understood that other authentication schemes could also be employed.

The digital signature for the capability negotiation message provides a way for another to check the authenticity of the capability negotiation message which was transferred by wireless communication device 110 during the capability exchange phase. In some examples, the digital signature for the capability negotiation message could include information representative of the capability negotiation message, along with possible other information, where this information is processed using the authentication key. In other examples, a hash is calculated from the capability negotiation message and the hash is encrypted using a private encryption key associated with wireless communication device 110 to create the digital signature for the capability negotiation message.

The capability negotiation message is then authenticated (206) by processing the digital signature for the capability negotiation message and the authentication key. In some examples, the authentication is done in wireless access node 120, while in other examples the authentication is done by systems in wireless communication network 130. As discussed above, the digital signature for the capability negotiation message and the authentication key are transferred during the authentication exchange phase of the network entry process, while the capability negotiation message is transferred during the capability exchange phase. The digital signature, in this example, contains information which can be used to authenticate the previously transferred capability negotiation message.

In some examples, the digital signature is processed with the authentication key to determine information representative of the capability negotiation message. The capability negotiation message can then be authenticated if the information from the digital signature properly correlates to the capability negotiation message. If the capability negotiation message was tampered with or altered, the digital signature would not properly correlate to the capability negotiation message. Thus, the capability negotiation message received during the capability exchange phase could be determined to have been altered prior to arrival at wireless access node 120.

In further examples, such as where the digital signature includes an encrypted hash calculated from the capability negotiation message, the authentication key could be used to decrypt the hash. The decrypted hash could then be processed to see if it correlates to the capability negotiation message. In examples of asymmetric public key cryptography schemes, the authentication key could be a public encryption key used to decrypt the digital signature.

As discussed above, the capability negotiation message as transferred by wireless communication device 110 could be tampered with. This tampering could include the techniques of spoofing where a capability negotiation message is falsified. In other examples of tampering, such as man-in-the-middle attacks, wireless communication device 110 or wireless access node 120 could be impersonated to obtain unauthorized access to information or communication resources exchanged wirelessly between wireless communication device 110 and wireless access node 120. Advantageously, since the capability negotiation message can be authenticated as described herein, tampering or impersonation can be detected when messages are not authentic. Also, an unprotected or unencrypted capability negotiation message could be transferred during the capability exchange phase, without altering any existing wireless communication protocols during the capability exchange phase. Then, after a subsequent authentication exchange phase, the capability negotiation message could be authenticated, advantageously minimizing the impact on the capability exchange phase.

Referring back to FIG. 1, wireless communication device 110 comprises radio frequency (RF) communication circuitry and an antenna. The RF communication circuitry typically includes amplifiers, filters, modulators, and signal processing circuitry. Wireless communication device 110 may also include a user interface, memory device, computer-readable storage medium, software, processing circuitry, or some other communication components. Wireless communication device 110 may be a telephone, computer, e-book, mobile Internet appliance, wireless network interface card, media player, game console, or some other wireless communication apparatus, including combinations thereof. In many examples, wireless communication device 110 is a mobile communication device.

Wireless access node 120 comprises RF communication and control circuitry and an antenna. The RF communication circuitry typically includes amplifiers, filters, RF modulators, and signal processing circuitry. Wireless access node 120 may also comprise a router, server, memory device, software, processing circuitry, cabling, power supply, network communication interface, physical structural support, or some other communication apparatus. Wireless access node 120 could be a base station, base transceiver station, Internet access node, telephony service node, wireless data access point, or some other wireless communication system, including combinations thereof.

Wireless communication network 130 comprises the core network of a wireless communications provider, and could include routers, gateways, telecommunication switches, processing systems, or other communications equipment and systems for providing communication and data services. Wireless communication network 130 may also comprise optical networks, asynchronous transfer mode (ATM) networks, packet networks, metropolitan-area networks (MAN), or other network topologies, equipment, or systems, including combinations thereof.

Wireless link 111 uses the air or space as the transport media. Wireless link 111 may use various protocols, such as Code Division Multiple Access (CDMA), Evolution Data Optimized (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format, including combinations, improvements, or variations thereof.

Communication link 121 uses metal, glass, optical, air, space, or some other material as the transport media. Communication link 121 could use various communication protocols, such as Time Division Multiplex (TDM), asynchronous transfer mode (ATM), Internet Protocol (IP), Ethernet, synchronous optical networking (SONET), communication signaling, or some other communication format, including combinations, improvements, or variations thereof.

Communication links 111 and 121 may each include many different signals sharing the same link—as represented by the associated lines in FIG. 1—comprising access channels, forward links, reverse links, beacon signals, user communications, communication sessions, overhead communications, frequencies, timeslots, transportation ports, logical transportation links, network sockets, packets, or communication directions. Communication link 121 could be a direct link or may include intermediate networks, systems, or devices.

Figure 3:
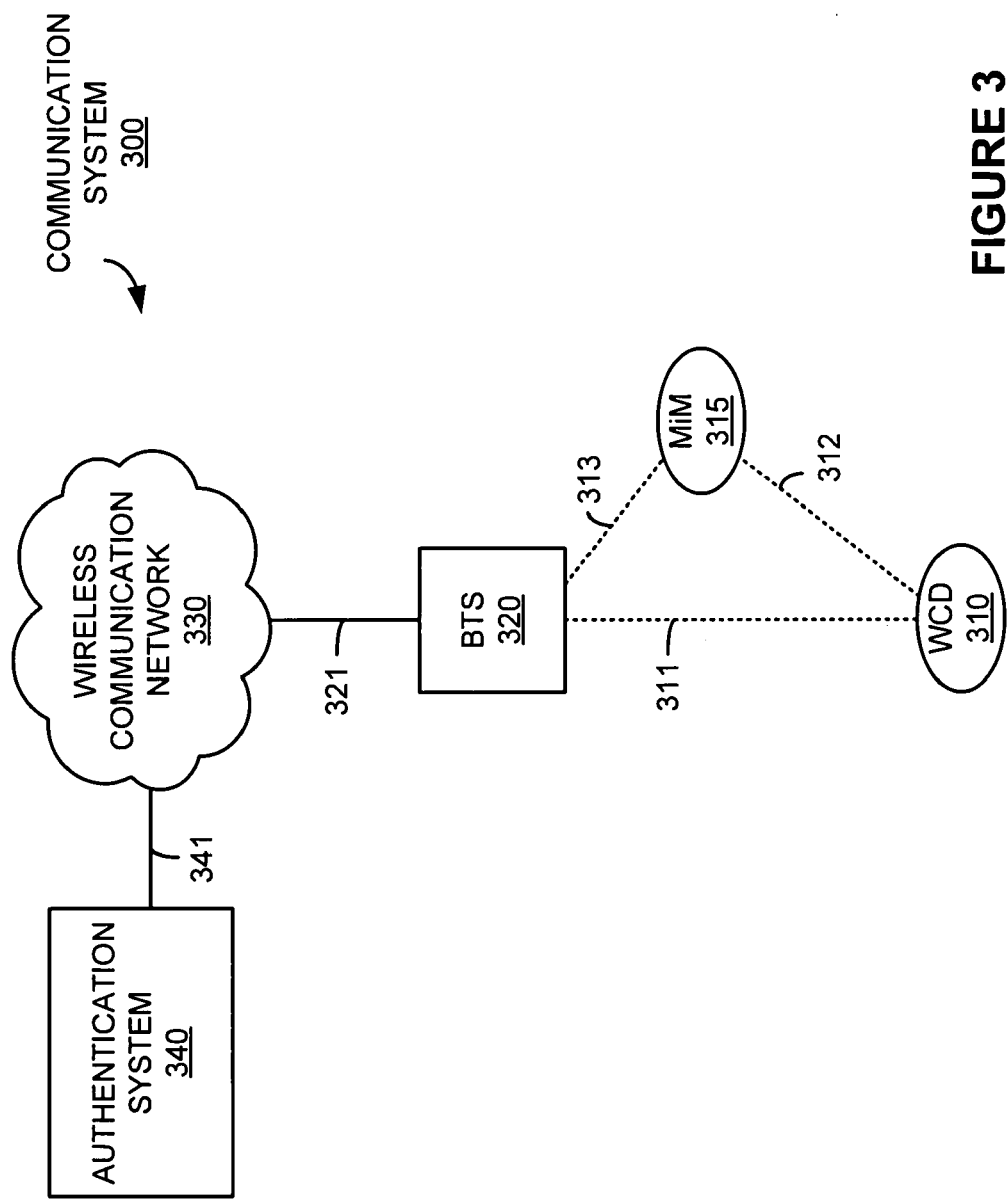
FIG. 3 is a system diagram illustrating a communication system.

FIG. 3 is a system diagram illustrating communication system 300. Communication system 300 includes wireless communication device (WCD) 310, man-in-the-middle (MiM) attacker 315, base transceiver station (BTS) 320, wireless communication network 330, and authentication system 340. WCD 310 and BTS 320 communicate over wireless link 311. MiM 315 can communicate with wireless communication device 310 over wireless link 312 and with BTS 320 over wireless link 313. BTS 320 and wireless communication network 330 communicate over link 321. Wireless communication network 330 and authentication system 340 communicate over link 341.

Wireless communication device (WCD) 310 is a wireless telephone in this example. Base transceiver station (BTS) 320 includes wireless communications equipment capable of communicating with and providing communication service to wireless communication devices. Wireless communication network 330 is a core network of a wireless communication provider in this example. Wireless communication network 330 could include further base transceiver stations, routers, gateways, controller systems, processing systems, or other communication equipment.

Man-in-the-middle (MiM) attacker 315 comprises a wireless device capable of communicating with both WCD 310 and BTS 320. MiM 315 includes antennas, transceivers, processing systems, or other equipment.

Authentication system 340 includes equipment and systems to authorize and authenticate wireless communication devices during network entry processes. Authentication system 340 could include processing systems, computer systems, encryption systems, digital data storage devices, or other equipment or systems.

Wireless links 311-313 comprise WiMAX wireless links in this example. Links 321 and 341 each comprise Internet Protocol (IP) links in this example. Wireless links 311-313, links 321 and 341 may each include many different signals sharing the same link, similar to links 111 and 121 discussed above.

Figure 4:
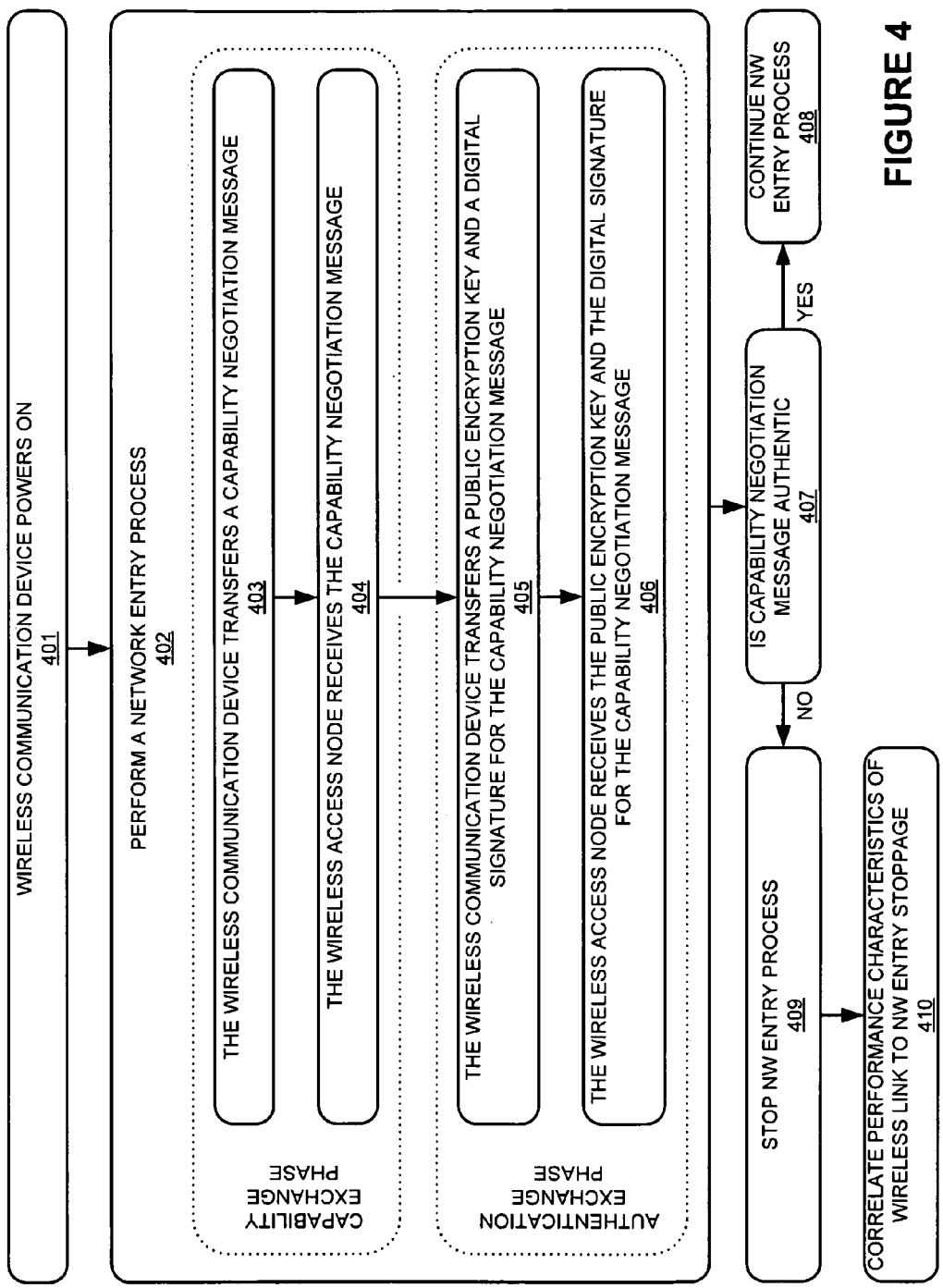
FIG. 4 is a flow diagram illustrating a method of operation of a communication system.

FIG. 4 is a flow diagram illustrating a method of operation of communication system 300, as shown in FIG. 3. The operations in FIG. 4 are listed herein parenthetically. In FIG. 4, WCD 310 powers on (201) and begins a network entry process (402).

The network entry process includes different phases during which WCD 310 and BTS 320 exchange information related to initiating wireless communications. In this example, the network entry process includes two phases: a capability exchange phase and a subsequent authentication exchange phase. Other examples could include different phases related to network entry.

In the capability exchange phase, WCD 310 transfers (403) a capability negotiation message. In this example, the capability negotiation message is transferred over wireless link 311. BTS 320 then receives (404) the capability negotiation message over wireless link 311. This capability negotiation message includes information related to establishing communication parameters supported by WCD 310 for exchanging user communications over wireless link 311. Some examples of this information in the capability negotiation message include modulation type support, power control options, bandwidth allocation parameters, security preferences, or other physical link information. In typical examples, BTS 320 also transfers a response to the capability negotiation message which indicates which parameters are then to be used in user communications over wireless link 311.

In the authentication exchange phase, WCD 310 transfers (405) at least a public encryption key and a digital signature for the capability negotiation message. In this example, the public encryption key and the digital signature for the capability negotiation message are transferred over wireless link 311. BTS 320 then receives (406) the public encryption key and the digital signature for the capability negotiation message over wireless link 311. In many examples of the authentication exchange phase, other information is exchanged related to establishing secure communications over wireless link 311.

The public encryption key allows another to validate whether data received from WCD 310 is authentic. In this example, the public encryption key is part of an asymmetric public key cryptography scheme and is used to authenticate data transferred from WCD 310 which has been digitally signed by WCD 310. The digital signature for the capability negotiation message provides a way for another to check the authenticity of the capability negotiation message which was transferred by WCD 310 during the capability exchange phase. In this example, a hash is first calculated from the capability negotiation message by WCD 310 and the hash is encrypted using a private encryption key associated with WCD 310 to create the digital signature for the capability negotiation message.

The capability negotiation message is then authenticated (407) by processing the digital signature for the capability negotiation message and the public encryption key. In some examples, the authentication is done in BTS 320, while in other examples the authentication is done by authentication system 340. As discussed above, the digital signature for the capability negotiation message and the public encryption key are transferred during the authentication exchange phase of the network entry process, while the capability negotiation message is transferred during earlier the capability exchange phase. The digital signature, in this example, contains information which can be used to authenticate the previously transferred capability negotiation message. In this example, the digital signature includes an encrypted hash calculated from the capability negotiation message, and the public encryption key is used to decrypt the hash. The decrypted hash is then processed to see if it correlates to the capability negotiation message. In other examples, the authentication exchange phase also includes exchanging encryption information used in schemes such as privacy key management (PKM), privacy key management version 2 (PKMv2), or Rivest-Shamir-Adleman (RSA) schemes.

If the capability negotiation message is authentic, then the network entry process continues (408), possibly allowing WCD 310 to initiate a phone call or other communication services. However, if the capability negotiation message is not authentic, then the network entry process is discontinued or stopped (409).

In many examples, WCD 310 does not know why the network entry process was stopped, and BTS 320 only is aware that the network entry was stopped due to a non-authentic capability negotiation message. The capability negotiation message could have been corrupted in transit due to present conditions of wireless link 311, due to noise around WCD 310 or BTS 320, or other factors. Additionally, the capability negotiation message could have been altered intentionally by MiM 315 impersonating WCD 310 or BTS 320, or due to other security attacks.

To detect if the network entry stoppage and associated non-authentic capability negotiation message was due to random conditions such as noise, or due to an intentional attack by MiM 315, performance characteristics of wireless link 311 could be correlated (410) to the network entry stoppage. During the network entry process, BTS 320 could monitor performance characteristics of the wireless link carrying the wireless communications of the network entry process, and detect when the network entry process is discontinued if the capability negotiation message is not authentic. The performance characteristics and a time of when the network entry process is discontinued due to the non-authentic capability negotiation message could be processed to determine if the performance characteristics near the time of when the network entry process is discontinued or when the capability negotiation message is received indicate a security breach on the wireless link.

For example, the performance characteristics could be a transmission delay of the wireless communications over the wireless link, signal strength of communications received at BTS 320, or other performance characteristics. In the example of where the performance characteristics include a transmission delay, a sudden change in transmission delay over wireless link 311 could indicate another device interposing between the communications of WCD 310 and BTS 320 and changing the transmission delay experienced for the communications. This is illustrated where the security breach is a man-in-the-middle attack in FIG. 3 by wireless links 312 and 313 associated with MiM 315 adding transmission delay as compared to wireless link 311. In other examples, a sudden change in perceived signal strength of communications detected at BTS 320 or WCD 310 could indicate a different device was transmitting communications at a time of a security attack than previous to the attack.

Figure 5:
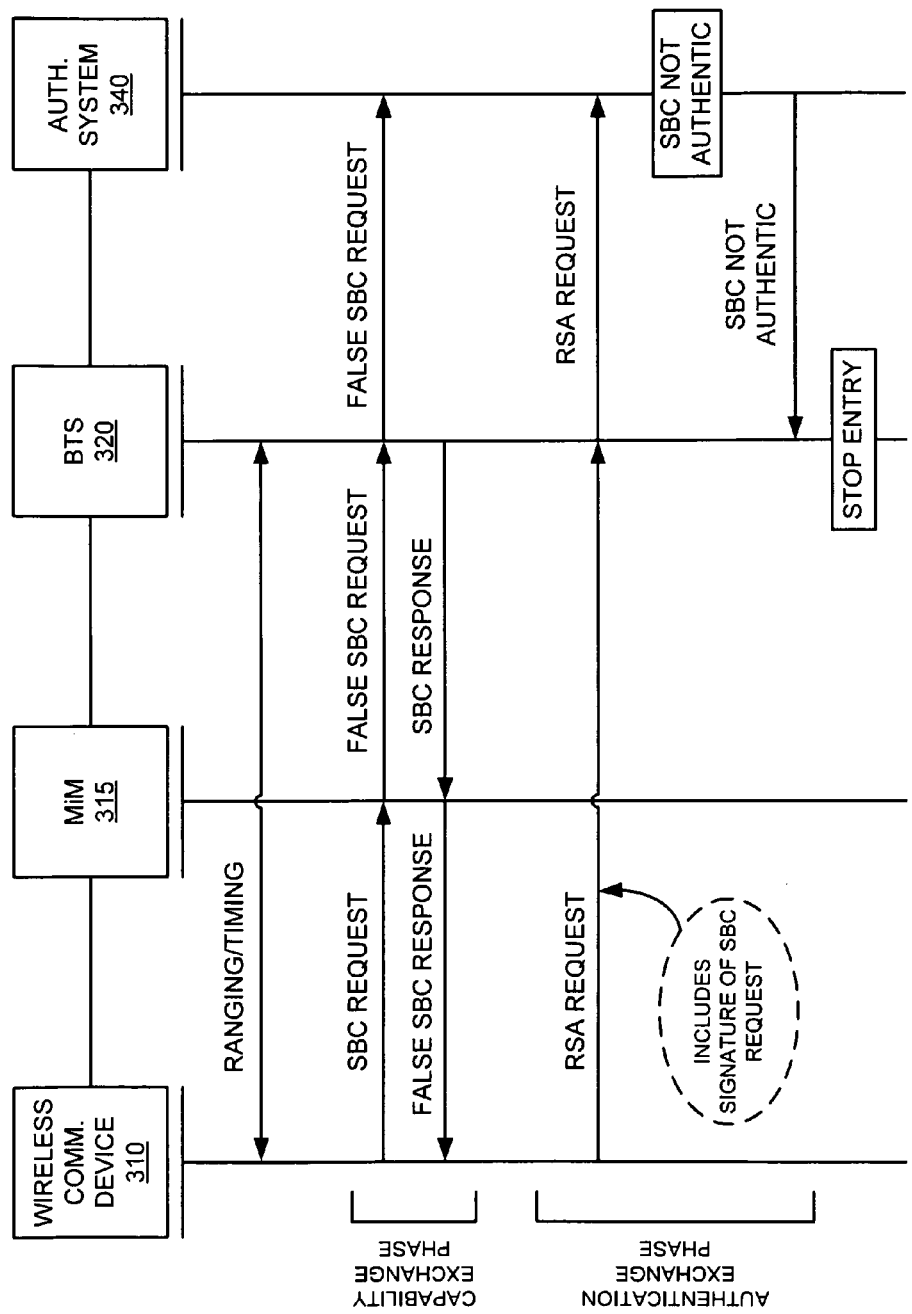
FIG. 5 is a sequence diagram illustrating a network entry process of a communication system.

FIG. 5 is a sequence diagram illustrating a network entry process of communication system 300, as shown in FIG. 3. In FIG. 5, WCD 310 and BTS 320 first exchange ranging and timing configuration information to establish basic communication parameters such as power levels, frequency usage, or other parameters over wireless link 311.

However, in this example, MiM 315 intercepts communications transferred by WCD 310 and poses as a false BTS. Thus, when WCD 310 enters the capability exchange phase, and transfers a capability negotiation message intended for BTS 320, WCD 310 instead transfers the capability negotiation message to MiM 315 over wireless link 312. In this example, the capability negotiation message is a worldwide interoperability for microwave access (WiMAX) subscriber station basic capability request (SBC-REQ) message. MiM 315 then transfers a false SBC request message to BTS 320 over wireless link 313 while posing as WCD 310.

In this manner, MiM poses as BTS 320 to WCD 310, and as WCD 310 to BTS 320, thus performing a man-in-the-middle attack. Thus, WCD 310 thinks it is communicating with legitimate BTS 320 over wireless link 311 but is instead communicating with MiM 315 over wireless link 312. Likewise, BTS 320 thinks it is communicating with legitimate WCD 310 over wireless link 311, but is instead communicating with MiM 315 over wireless link 313.

In this example, BTS 320 receives the false SBC request message and forwards it on to authentication system 340 for later authentication. BTS 320 then responds to the received SBC request message, false or otherwise, with an SBC response message. MiM 315, posing as WCD 310, intercepts this SBC response message over wireless link 313 and transfers a false SBC response message to WCD 310. MiM 315 could change the parameters in the SBC request and response messages and fabricate false request and response messages as a part of the security attack. WCD 310 then receives the false SBC response message from MiM.

During the authentication exchange phase, in this example, WCD 310 transfers a worldwide interoperability for microwave access (WiMAX) Rivest-Shamir-Adleman (RSA) request message for delivery to BTS 320 which also includes a digital signature for the original SBC request message, a public encryption key of WCD 310, among other security-related information. The RSA request message contains encryption and security information which may or may not be intercepted by MiM 315 in this example. BTS 320 receives this RSA request message and transfers it to authentication system 340 to aid in authenticating the SBC message as received by BTS 320 during the capability exchange phase. Authentication system 340 then processes the received SBC request message and the digital signature of the original SBC request message to determine if the received SBC request message is authentic.

In this example, MiM 315 has tampered with the SBC request message to create the false SBC request message. Also in this example, the digital signature for the original SBC request message was created by WCD 310 encrypting information associated with the original SBC request message with a private encryption key of WCD 310. MiM 315 could not alter the digital signature for the original SBC request message without having the private encryption key of WCD 310, which in typical examples, MiM 315 does not have. If MiM 315 attempts to alter the digital signature for the original SBC request message without the private encryption key of WCD 310, the digital signature for the original SBC request message will still not correlate to the false SBC request message as received by authentication system 340. Thus, whether MiM 315 falsifies the SBC request message during the capability exchange phase, or alters the digital signature for the original SBC request message or the public encryption key during the authentication exchange phase, authentication system 340 can still determine that the false SBC request message is not authentic. Authentication system 340 communicates the non-authenticity of the received SBC message to BTS 320 which in turn stops further network entry for WCD 310.

FIG. 6 is a sequence diagram illustrating a network entry process of communication system 300, as shown in FIG. 3. In FIG. 6, WCD 310 and BTS 320 first exchange ranging and timing configuration information to establish basic communication parameters such as power levels, frequency usage, or other parameters over wireless link 311.

However, in this example, MiM 315 intercepts communications transferred by WCD 310 and poses as a false BTS. Thus, when WCD 310 enters the capability exchange phase, and transfers a capability negotiation message intended for BTS 320, WCD 310 instead transfers the capability negotiation message to MiM 315 over wireless link 312. In this example, the capability negotiation message is a worldwide interoperability for microwave access (WiMAX) subscriber station basic capability request (SBC-REQ) message. MiM 315 then transfers a false SBC request message to BTS 320 over wireless link 313 while posing as WCD 310.

In this manner, MiM poses as BTS 320 to WCD 310, and as WCD 310 to BTS 320, thus performing a man-in-the-middle attack. Thus, WCD 310 thinks it is communicating with legitimate BTS 320 over wireless link 311 but is instead communicating with MiM 315 over wireless link 312. Likewise, BTS 320 thinks it is communicating with legitimate WCD 310 over wireless link 311, but is instead communicating with MiM 315 over wireless link 313.

In this example, BTS 320 receives the false SBC request message and forwards it on to authentication system 340 for possible later authentication. BTS 320 then responds to the received SBC request message, false or otherwise, with an SBC response message. MiM 315, posing as WCD 310, intercepts this SBC response message over wireless link 313 and transfers a false SBC response message to WCD 310. MiM 315 could change the parameters in the SBC request and response messages and fabricate false request and response messages as a part of the security attack. WCD 310 then receives the false SBC response message from MiM.

During the authentication exchange phase, in this example, WCD 310 transfers a worldwide interoperability for microwave access (WiMAX) privacy key management request (PKM-REQ) message for delivery to BTS 320 which also includes a digital signature for the original SBC request message, a public encryption key of WCD 310, among other security-related information. BTS 320 receives this PKM request message and transfers it to authentication system 340 to aid in authenticating the SBC message as received by BTS 320 during the capability exchange phase.

Also, during the authentication exchange phase, in this example, authentication system 340, through BTS 320, transfers an PKM response message for delivery to WCD 310 which also includes a digital signature for the original SBC response message, a public encryption key of associated with wireless communication network 330, among other security-related information. The PKM request and response messages contain encryption and security information which may or may not be intercepted by MiM 315 in this example. Authentication system 340 could then processes the received SBC request message and the digital signature of the original SBC request message to determine if the received SBC request message is authentic. Additionally, WCD 310 could process the received SBC response message and the digital signature of the original SBC response message to determine if the received SBC response message is authentic.

In this example, MiM 315 has tampered with the SBC request and response messages to create the false SBC request and response messages. Also in this example, the digital signature for the original SBC request message was created by WCD 310 encrypting information associated with the original SBC request message with a private encryption key of WCD 310. Likewise, the digital signature for the original SBC response message was created by authentication system 340 encrypting information associated with the original SBC response message with a private encryption key associated with wireless communication network 330.

MiM 315 could not alter the digital signature for the original SBC request or response messages without having the private encryption key of WCD 310 for the SBC request and the private encryption key associated with wireless communication network 330 for the SBC response, which in typical examples, MiM 315 does not have. If MiM 315 attempts to alter the digital signature for the original SBC request or response messages without the proper private encryption keys, the digital signature for the original SBC request or response messages will still not correlate to the false SBC request or response messages. Thus, whether MiM 315 falsifies the SBC request or response messages during the capability exchange phase, or alters the digital signature for the original SBC request or response messages (or the public encryption keys) during the authentication exchange phase, the authenticity of the false SBC request or response messages can be determined. In this example, once WCD 310 determines the SBC response message was not authentic, the network entry processes is discontinued. If the SBC response was authentic, WCD 310 could continue the network entry process.

FIGS. 1-6 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless communication system, the method comprising:
   exchanging wireless communications between a wireless access node and a wireless communication device to perform a network entry process, wherein the network entry process comprises at least a capability exchange phase and a subsequent authentication exchange phase;
   monitoring performance characteristics of a wireless link between the wireless communication device and the wireless access node carrying the wireless communications of the network entry process;
   during the capability exchange phase, transferring a capability negotiation message from the wireless communication device, and receiving the capability negotiation message in the wireless access node;
   during the authentication exchange phase, transferring an authentication key associated with the wireless communication device and a digital signature for the capability negotiation message from the wireless communication device, and receiving the authentication key associated with the wireless communication device and the digital signature for the capability negotiation message in the wireless access node;

authenticating the capability negotiation message by processing the digital signature for the capability negotiation message and the authentication key associated with the wireless communication device;

detecting when the network entry process is discontinued if the capability negotiation message is not authentic; and processing the performance characteristics and a time of when the network entry process is discontinued to determine if the performance characteristics at the time of when the network entry process is discontinued indicate a security breach on the wireless link.

2. The method of claim 1, further comprising:
continuing the network entry process if the capability negotiation message is authentic, and discontinuing the network entry process if the capability negotiation message is not authentic.

3. The method of claim 1, further comprising:
determining a response to the capability negotiation message and a digital signature for the response to the capability negotiation message;

during the capability exchange phase, transferring for delivery to the wireless communication device the response to the capability negotiation message, and receiving the response to the capability negotiation message in the wireless communication device;

during the authentication exchange phase, transferring for delivery to the wireless communication device an authentication key associated with the wireless communication system and the digital signature for the response to the capability negotiation message, and receiving the authentication key associated with the wireless communication system and the digital signature for the response to the capability negotiation message in the wireless communication device; and in the wireless communication device, authenticating the response to the capability negotiation message based upon the digital signature for the response to the capability negotiation message and the authentication key associated with the wireless communication system.

4. The method of claim 3, further comprising:
in the wireless communication device, continuing the network entry process if the response to the capability negotiation message is authentic, and discontinuing the network entry process if the response to the capability negotiation message is not authentic.

5. The method of claim 3, wherein the digital signature for the capability negotiation message is based upon a private encryption key of the wireless communication device and the capability negotiation message, and wherein the digital signature for the response to the capability negotiation message is based upon a private encryption key of the wireless communication system and the response to the capability negotiation message.

6. The method of claim 1, wherein the performance characteristics comprise a transmission delay of the wireless communications over the wireless link.

7. The method of claim 1, wherein the security breach is a man-in-the-middle attack.

8. The method of claim 1, wherein the capability negotiation message comprises a worldwide interoperability for microwave access (WiMAX) subscriber station basic capability request (SBC-REQ) message.

9. The method of claim 1, wherein the authentication request message comprises a worldwide interoperability for microwave access (WiMAX) privacy key management request (PKM-REQ) message.

10. A wireless communication system, comprising:
a wireless access node and a wireless communication device configured to perform a network entry process by exchanging wireless communications, wherein the network entry process comprises at least a capability exchange phase and a subsequent authentication exchange phase;

the wireless access node configured to monitor performance characteristics of a wireless link between the wireless communication device and the wireless access node carrying the wireless communications of the network entry process;

during the capability exchange phase, communication circuitry of the wireless communication device configured to transfer a capability negotiation message, and the wireless access node configured to receive the capability negotiation message;

during the authentication exchange phase, the communication circuitry of the wireless communication device configured to transfer an authentication key associated with the wireless communication device and a digital signature for the capability negotiation message, and the wireless access node configured to receive the authentication key associated with the wireless communication device and the digital signature for the capability negotiation message;

the wireless access node configured to authenticate the capability negotiation message by processing the digital signature for the capability negotiation message and the authentication key associated with the wireless communication device; and the wireless access node configured to detect when the network entry process is discontinued if the capability negotiation message is not authentic, and process the performance characteristics and a time of when the network entry process is discontinued to determine if the performance characteristics at the time of when the network entry process is discontinued indicate a security breach on the wireless link.

11. The wireless communication system of claim 10, comprising:
the wireless access node continues the network entry process if the capability negotiation message is authentic, and discontinues the network entry process if the capability negotiation message is not authentic.

12. The wireless communication system of claim 10, comprising:
the wireless access node determines a response to the capability negotiation message and a digital signature for the response to the capability negotiation message;

during the capability exchange phase, the wireless access node transfers the response to the capability negotiation message, and the wireless communication device receives the response to the capability negotiation message;

during the authentication exchange phase, the wireless access node transfers an authentication key associated with the wireless communication system and the digital signature for the response to the capability negotiation message, and the wireless communication device receives the authentication key associated with the wireless communication system and the digital signature for the response to the capability negotiation message; and the wireless communication device authenticates the response to the capability negotiation message based upon the digital signature for the response to the capability negotiation message and the authentication key associated with the wireless communication system.

13. The wireless communication system of claim 12, comprising:
the wireless communication device continues the network entry process if the response to the capability negotiation message is authentic, and discontinue the network entry process if the response to the capability negotiation message is not authentic.

14. The wireless communication system of claim 12, wherein the digital signature for the capability negotiation message is based upon a private encryption key of the wireless communication device and the capability negotiation message, and wherein the digital signature for the response to the capability negotiation message is based upon a private encryption key of the wireless communication system and the response to the capability negotiation message.

15. The wireless communication system of claim 10, wherein the performance characteristics comprise a transmission delay of the wireless communications over the wireless link.

16. The wireless communication system of claim 10, wherein the security breach is a man-in-the-middle attack.

17. The wireless communication system of claim 10, wherein the capability negotiation message comprises a worldwide interoperability for microwave access (WiMAX) subscriber station basic capability request (SBC-REQ) message.

18. The wireless communication system of claim 10, wherein the authentication request message comprises a worldwide interoperability for microwave access (WiMAX) privacy key management request (PKM-REQ) message.

* * * * *